Jan. 4, 1949. J. STEPHEN 2,458,312
SUPPORT FOR TRAILER VEHICLES
Filed March 6, 1947
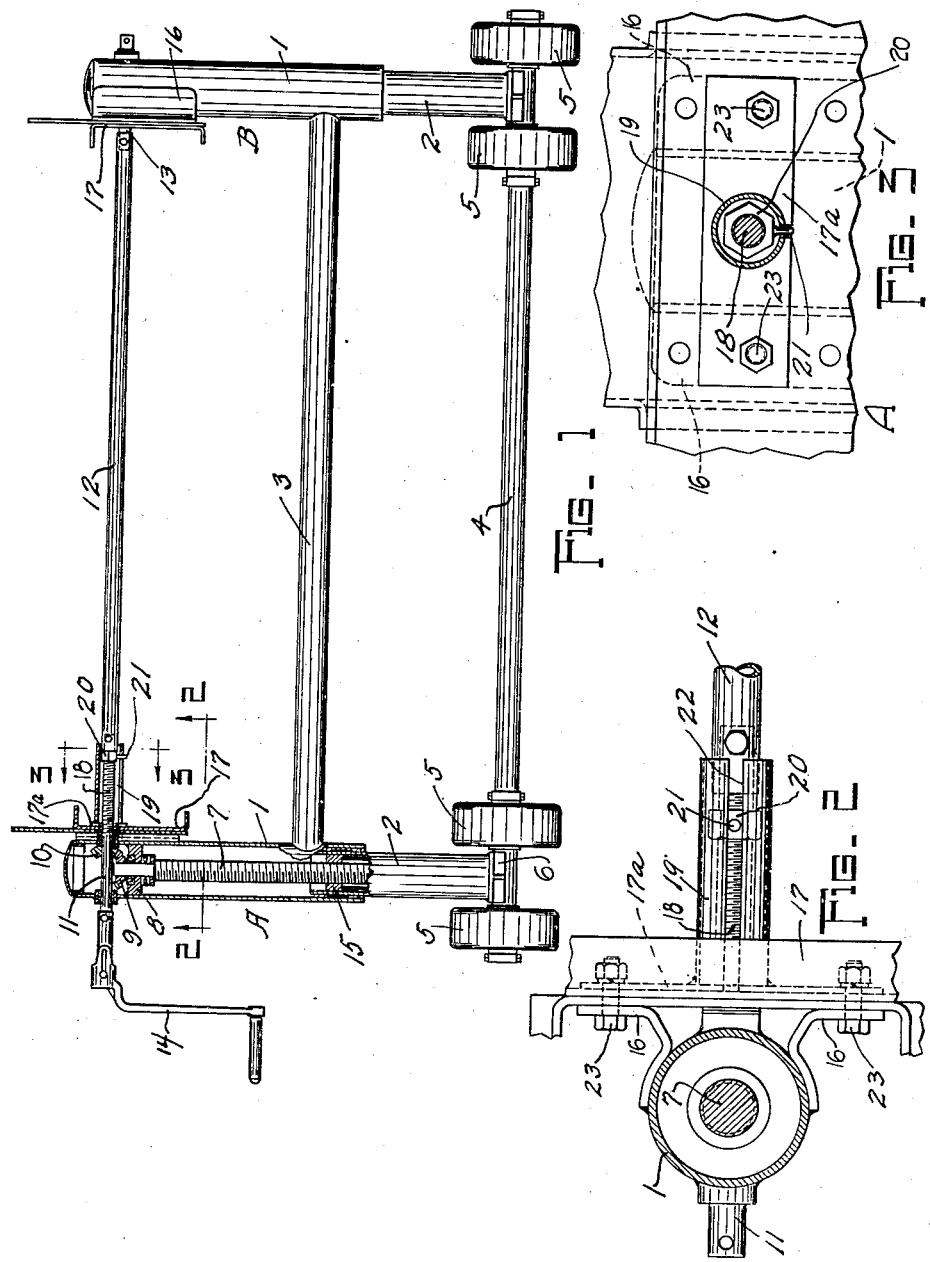
INVENTOR.
James Stephen
BY Robb & Robb
Attorneys Patented Jan. 4, 1949

2,458,312

UNITED STATES PATENT OFFICE 2,458,312

SUPPORT FOR TRAILER VEHICLES

James Stephen, Edgerton, Wis., assignor to Highway Trailer Company, Edgerton, Wis., a corporation Application March 6, 1947, Serial No. 732,835

5 Claims. (Cl. 254—86)

My present invention pertains to the art of trailer vehicles such as are generally used in combination with tractor vehicles for the hauling of freight or other loads, and generally known as "semi-trailers."

The improvements of my invention relate primarily to the vertical wheel supports that are commonly provided near the front end of a trailer vehicle, which supports are adjustable for maintaining the said wheels carried thereby above the ground level, when the trailer is being transported by the tractor from place to place, the support means having provision in the way of operating mechanism whereby the wheels may be lowered to engage the ground when the tractor vehicle is disconnected from the trailer vehicle according to common practice.

My invention involves an improved type of construction for the vertical support for the wheels at the front of the trailer, in relation particularly to the special means which I provide for limiting the downward movement of certain members of the support carrying the wheels, in order to bring the latter into engagement with the ground.

A common type of wheel support of the class to which my improvements relate comprises a pair of wheel supporting legs, each of which includes relatively slidable vertical telescopic members, the lower member of each leg having the supporting wheel or wheels attached thereto, and the upper member of each leg being equipped with a screw-jacking member or unit adapted to operate in a fixed nut member on the lower leg section so that upon rotation of the screw jacking member the lower member of each leg section may be moved downwardly or elevated according to the adjustment desired.

Generally speaking, in the type of vertical support to which I refer above, the downward movement of the lower leg section by the jacking means has been limited by the provision of a stop member in the form of a pin or ball check, the latter being carried by one of the members of the leg and operating in a slot or guideway in the other of said members. It has been found in practice that the above described type of limiting means is not very effective for its purpose because in these vertical supports there is generally provided an operating shaft geared to the jacking members or units in the two leg members, and this operating shaft, with the screw jacking means actuated thereby, affords such great power, or mechanical leverage advantages, that the limiting stop is not infrequently broken off in the operation of lowering the lower sections or members of the legs of the support, or otherwise incapacitated or rendered partially ineffective.

In the carrying out of my invention I do away with the above mentioned type of limiting means for controlling the extent of the lowering movement of the lower telescoping members of the leg, and I use, in lieu thereof, certain novel instrumentalities directly cooperating with the horizontal manually operated driving shaft for the jacking members, whereby to limit the degree or amount of rotation of this driving shaft, and thus correspondingly limiting the rotation of the jacking screws as the latter are turned in order to move downwardly the lower sections or members of the legs that carry the wheels into engagement with the ground. By reason of the employment of the novel provisions of my invention, there is avoided the likelihood of breakage of the stop devices or members heretofore employed, or improper action of the ball check stopping means above referred to.

A complete understanding of my invention, including the principles of operation thereof, and a preferred construction suitable for the carrying out of the invention, will be had upon reference to the following detail description in conjunction with the anexed drawing, in the latter of which:

Figure 1 is a view in front elevation of a vertical support of the general type for which the improvements of my invention are adapted, the upper portion of one of the wheel carrying legs of the support being broken away and shown in section to disclose the interior jacking instrumentality that is carried within the upper member of each of the legs of the support.

Figure 2 is a horizontal sectional view taken about on the line 2—2 of Figure 1 and looking in the direction of the arrows.

Figure 3 is a fragmentary sectional view taken about on the line 3—3 of Figure 1, looking toward the left telescopic leg of the vertical support.

In the accompanying drawings I have illustrated the vertical support unit of my invention alone, in the form thereof in which it will be mounted upon the front end portion of a trailer vehicle, the latter not illustrated. In certain of its general features, as indicated before, the vertical support is similar to many of those at present in use. It comprises what I generally term the vertical supporting legs A and B, each of which consists of an upper tubular section 1 and a lower tubular section 2, the upper end of which telescopes within the section or member 1. The upper members 1 of the legs A and B are preferably connected by means of a cross bar 3 rigidly attached to the members 1 at the ends of said bar, as by welding, or any other suitable means.

At their lower ends, the lower members or sections 2 of the legs A and B are connected together by a cross axle 4 which carries at each end thereof a pair of rollers or wheels 5, and this axle 4 is suitably rigidly connected with the lower ends of the members 2 by the bearing portions 6 of said members. Largely contained in each of the upper members 1 of the legs A and B is a jack screw or screw shaft 7, the upper ends of which passes through a bearing 8 rigid within the tubular or hollow body of the member 1. Keyed to the upper extremity of the jack shaft 7 is a bevel gear 9 meshing with a bevel gear 10 keyed to the left end section 11 of a driving shaft which comprises the section 11, the middle section 12, and another end section 13, said several sections pinned together.

On the outer end of the shaft section 11 is mounted a foldable crank handle 14 by which manual power is applied to the driving shaft, including the several sections mentioned, for the turning of said shaft. Rotation of the driving shaft 11—12—13 will obviously rotate the gears 9 and 10 located in each of the upper members 1 of the legs A and B, thereby imparting corresponding rotation to the jack shafts 7 that are carried within each of said members 1.

Within the upper end portion of each of the lower members 2 of the legs A and B is located a rigid or stationary nut 15 attached to such member 2 by welding or otherwise, and not rotative.

It will be understood that the gears and jack shaft and nut means described in reference to the left hand leg shown in Figure 1 are duplicated in relation to the right hand leg B which is shown in elevation and not in section.

Each of the upper members 1 of the two legs A and B may be supplied with bracket parts shown in Figure 2 and designated 16, the same to be welded or substantially secured to the parts 1, and bolted or otherwise attached at their free outer ends to the chassis or frame of the trailer vehicle, sides of the said chassis or frame being shown at 17 in Figure 1.

It will be apparent from the provisions which I have described above that the turning of the crank 14 under manual power correspondingly rotating the driving shaft composed of the sections 11, 12, and 13, will be susceptible of use for rotating said driving shaft in either of opposite directions. When the driving shaft is driven in one direction, the screw jacks 7 of the legs A and B will be rotated in one direction to thereby cause a lowering movement of the members 2 of the legs A and B, reverse operation of the driving shaft means being similarly adapted to elevate the legs by upward movement of the members 2 carrying with them the rollers or wheels 5. The upward movement is effected when the trailer vehicle is connected to the tractor vehicle for transportation purposes, and the lowering movement will be caused when the trailer vehicle is ready to be detached from the tractor vehicle, the wheels 5 being then lowered for ground engagement in a manner well known to those versed in this art.

Special means of my invention utilized for limiting the lowering movement of the wheels 5 with the lower sections or members 2 of the legs A and B, comprise the provisions of a screw thread 18 on the section 11 of the manually operated driving shaft. The screw thread 18 is carried by the inner end of said shaft at a point beyond the inner side of the adjustable leg A. Rigidly attached to the said inner side of a plate 17a secured to the inner side of the channel 17 adjacent to the leg A is a nut guiding tube 19, and in this tube is received a nut 20 adapted to move longitudinally of the threaded section 18 of the shaft section 11, incident to rotation of the latter. The nut 20 is prevented from rotating by the provision of a lug or guide pin 21 which projects downwardly from the nut and passes through longitudinal slots 22 at the bottom portion of the tube 19. The plate 17a is attached to its channel or chassis member 17 by the bolts 23 that connect the brackets 16 to the chassis 17.

In the travel thereof longitudinally of shaft section 11, the nut 20 is adapted to abut at its outer side with the portion of the member or plate 17a from which the tube 19 extends. The movement of the nut 20 outwardly toward the crank handle 14 will be compelled incident to turning the said handle and the driving shaft 11—12—13, for operating the jacking screws 7 to cause the downward movement of the wheels 5 to bring them into engagement with the ground surface.

From the foregoing description it will be quite evident that during the above mentioned turning of the crank handle 14 to bring the wheel 5 to the ground surface, the rotation of the driving shaft for the jacking screws 7 will be stopped as soon as the nut 20 abuts with the inner side of the plate member 17a of the chassis frame structure near the leg A, and the operator at the crank handle 14 will be advised promptly by the resistance of the engaging action of the nut 20 with said member 17a that the movement of the wheels 5 downwardly is at the lower limit necessary for ground engagement, and at the same time further turning of the crank handle 14 will be prevented. The nut 20 obviously could engage the frame member 17 adjacent thereto, if desired.

By the above means I do away with the employment of any stopping devices intermediate the parts 1 and 2 of the legs A and B, which stopping devices would be mutilated or damaged ofttimes by excessive movement of the handle 14, driving shaft, and jacking screws actuated from said shaft.

Having thus described my invention, what I claim as new and desire to secure by Letters Patent of the United States, is—

1. A vertical support for trailers, comprising, in combination, a pair of vertical supporting legs attachable to a trailer frame, each leg comprising an upper member and a lower member in telescopic relation, a connecting bar between the legs, a jacking screw on the upper member of each leg having screw connection with the associated lower member to move the latter relatively up and down, a driving shaft common to both legs and having driving connection with the jacking screws, and means comprising a screw section on the driving shaft, and an abutment member operable by the said screw section for engaging the frame structure adjacent one of the upper leg members to resist turning of the driving shaft.

2. A vertical support as claimed in claim 1, in which the abutment member is a nut in threaded connection with the screw section of the shaft, a tube attached to said adjacent upper leg member having a guide slot, disposed longitudinally of the shaft, and a pin on the said nut engaged in said slot to prevent turning of the nut.

3. In combination, a supporting frame, a jack support mounted thereon and comprising an upper member rigid with the frame, a lower member slidable on the upper member from a position retracted relative to the upper member to one extended therefrom, a jacking screw on the upper member connected to the lower member for effecting said retracting and extending movements of the latter, an operating shaft connected with the screw to rotate same in opposite directions and comprising a screw threaded section, a nut member having a threaded portion receiving said screw section so as to be moved longitudinally of the screw section as the operating shaft is rotated, means to prevent turning of the nut member on the screw section, and a stationary part disposed in the path of the nut to stop its movement and set up resistance to turning of the shaft to stop such turning when the slidable lower member has been moved to its extended position.

4. The combination claimed in claim 3, in which the means to prevent turning of the nut member comprises a tubular part stationary on the frame disposed to surround the screw section of the operating shaft and interlocking with the nut member.

5. The combination claimed in claim 3, in which the means to prevent turning of the nut member comprises a longitudinally slotted tubular member carried by the frame adjacent to the upper member and surrounding the screw section of the operating shaft, the nut having a part entering the slotted portion of the tubular member to guide the nut member in its movement as compelled by rotation of the operating shaft.

JAMES STEPHEN.

REFERENCES CITED

The following references are of record in the file of this patent:

UNITED STATES PATENTS

| Number | Name | Date |
|---|---|---|
| 1,422,500 | Walker | July 11, 1922 |
| 2,347,921 | Miller | May 2, 1944 |
| 2,446,517 | Black | Aug. 10, 1948 |

FOREIGN PATENTS

| Number | Country | Date |
|---|---|---|
| 116,519 | Austria | Feb. 25, 1930 |